United States Patent
Barbour et al.

(10) Patent No.: US 12,526,488 B2
(45) Date of Patent: *Jan. 13, 2026

(54) CONTENT AGGREGATION

(71) Applicant: Comcast Cable Communications, LLC, Philadelphia, PA (US)

(72) Inventors: Matt Barbour, Petaluma, CA (US); John Hickey, Novato, CA (US); Osbert Orr, Daly City, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,628

(22) Filed: Jul. 3, 2024

(65) Prior Publication Data
US 2025/0047956 A1    Feb. 6, 2025

Related U.S. Application Data

(63) Continuation of application No. 17/518,333, filed on Nov. 3, 2021, now Pat. No. 12,058,421, which is a continuation of application No. 16/108,744, filed on Aug. 22, 2018, now Pat. No. 11,202,129, which is a continuation of application No. 13/831,009, filed on Mar. 14, 2013, now Pat. No. 10,085,071.

(51) Int. Cl.
*H04N 21/81* (2011.01)
*G06Q 30/0241* (2023.01)
*H04N 5/76* (2006.01)
*H04N 21/234* (2011.01)
*H04N 21/4147* (2011.01)
*H04N 21/433* (2011.01)
*H04N 21/44* (2011.01)
*H04N 21/472* (2011.01)
*H04N 21/845* (2011.01)

(52) U.S. Cl.
CPC ....... *H04N 21/812* (2013.01); *G06Q 30/0241* (2013.01); *H04N 5/76* (2013.01); *H04N 21/23424* (2013.01); *H04N 21/4147* (2013.01); *H04N 21/4334* (2013.01); *H04N 21/44008* (2013.01); *H04N 21/47214* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,012,653 B1 | 3/2006 | Strickland et al. | |
| 7,234,115 B1 * | 6/2007 | Sprauve | H04L 12/66 715/744 |
| 8,752,085 B1 * | 6/2014 | Brueck | H04N 21/812 725/35 |
| 9,088,823 B1 * | 7/2015 | Price | H04N 21/2668 |

(Continued)

FOREIGN PATENT DOCUMENTS

WO    WO-2008067263 A2 *  6/2008  .......... G06F 3/0481

*Primary Examiner* — Ricky Chin
(74) *Attorney, Agent, or Firm* — Banner & Witcoff, Ltd.

(57) ABSTRACT

A content management system may assist users in managing consumption of content, such as television programs. Primary content may be segmented into portions, where a secondary content is interspersed between a first portion and a second portion of the primary content. The first portion and the second portion may be aggregated sequentially.

20 Claims, 7 Drawing Sheets

(56) References Cited

U.S. PATENT DOCUMENTS

| | | | | |
|---|---|---|---|---|
| 10,085,071 | B2* | 9/2018 | Barbour | H04N 5/76 |
| 11,202,129 | B2* | 12/2021 | Barbour | H04N 21/23424 |
| 12,058,421 | B2* | 8/2024 | Barbour | H04N 21/8456 |
| 2002/0144263 | A1* | 10/2002 | Eldering | H04H 20/10 |
| | | | | 348/E7.063 |
| 2002/0174430 | A1* | 11/2002 | Ellis | H04N 21/4753 |
| | | | | 386/230 |
| 2004/0196410 | A1* | 10/2004 | Johnson | H04N 21/8456 |
| | | | | 348/E7.054 |
| 2006/0013554 | A1* | 1/2006 | Poslinski | H04N 21/4828 |
| | | | | 386/250 |
| 2007/0156739 | A1* | 7/2007 | Black | H04N 21/4325 |
| | | | | 348/E7.071 |
| 2007/0209005 | A1* | 9/2007 | Shaver | G06F 16/958 |
| | | | | 707/E17.116 |
| 2008/0127246 | A1 | 5/2008 | Sylvain | |
| 2008/0140521 | A1* | 6/2008 | Jambunathan | G06Q 30/0263 |
| | | | | 707/999.005 |
| 2009/0055873 | A1* | 2/2009 | Kim | G06Q 30/02 |
| | | | | 725/58 |
| 2009/0093278 | A1* | 4/2009 | Negron | G11B 27/034 |
| | | | | 707/999.102 |
| 2009/0150230 | A1* | 6/2009 | Verhaegh | H04N 21/44016 |
| | | | | 705/14.41 |
| 2009/0172723 | A1* | 7/2009 | Shkedi | H04N 21/4312 |
| | | | | 725/32 |
| 2009/0204664 | A1* | 8/2009 | Yovin | H04N 21/458 |
| | | | | 709/203 |
| 2010/0199299 | A1* | 8/2010 | Chang | H04N 21/4532 |
| | | | | 725/32 |
| 2011/0029606 | A1* | 2/2011 | Ozawa | H04N 21/440281 |
| | | | | 709/203 |
| 2011/0099076 | A1* | 4/2011 | Repas | G06Q 30/0273 |
| | | | | 705/14.69 |
| 2011/0109801 | A1 | 5/2011 | Thomas et al. | |
| 2011/0178873 | A1* | 7/2011 | Lagudi | G06Q 30/02 |
| | | | | 705/14.57 |
| 2011/0179356 | A1 | 7/2011 | Bassali et al. | |
| 2011/0247027 | A1* | 10/2011 | Davis | H04N 21/25435 |
| | | | | 725/31 |
| 2012/0117584 | A1* | 5/2012 | Gordon | H04N 21/8358 |
| | | | | 725/19 |
| 2012/0137015 | A1* | 5/2012 | Sun | G11B 27/10 |
| | | | | 709/231 |
| 2012/0163774 | A1* | 6/2012 | Harper | H04N 21/6582 |
| | | | | 386/250 |
| 2012/0185895 | A1 | 7/2012 | Wong et al. | |
| 2012/0308192 | A1* | 12/2012 | Chung | H04N 21/4532 |
| | | | | 386/230 |
| 2013/0007799 | A1* | 1/2013 | Sandoval | H04N 21/812 |
| | | | | 725/32 |
| 2013/0014171 | A1* | 1/2013 | Sansom | H04N 21/4821 |
| | | | | 725/52 |
| 2013/0090995 | A1* | 4/2013 | Forrester | G06Q 30/02 |
| | | | | 705/14.4 |
| 2013/0144720 | A1* | 6/2013 | Hari | G06Q 30/0241 |
| | | | | 705/14.55 |
| 2013/0144725 | A1 | 6/2013 | Li et al. | |
| 2013/0219424 | A1* | 8/2013 | Lechner | H04N 21/4325 |
| | | | | 725/32 |
| 2015/0172737 | A1* | 6/2015 | Lechner | H04N 21/84 |
| | | | | 725/32 |
| 2019/0222906 | A1* | 7/2019 | Barbour | H04N 21/812 |
| 2022/0272421 | A1* | 8/2022 | Barbour | H04N 21/812 |

* cited by examiner

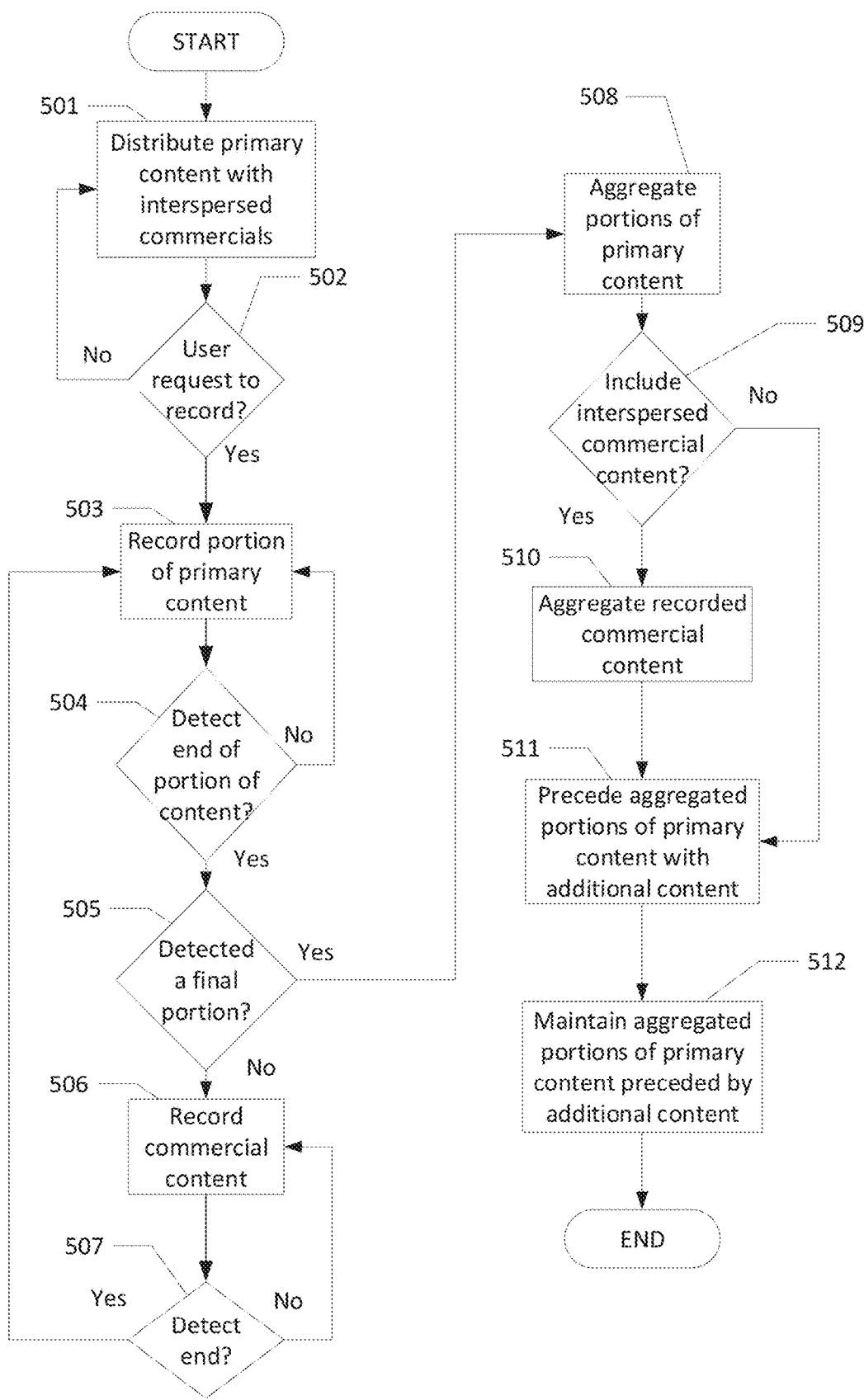

CONTENT AGGREGATION

CROSS-REFERENCE TO RELATED APPLICATIONS

This application is a continuation of and claims priority to U.S. patent application Ser. No. 17/518,333, filed Nov. 3, 2021, which is a continuation of U.S. patent application Ser. No. 16/108,744, filed on Aug. 22, 2018 (now U.S. Pat. No. 11,202,129), which is a continuation of U.S. patent application Ser. No. 13/831,009 (now U.S. Pat. No. 10,085,071), filed on Mar. 14, 2013, each of which is hereby incorporated by reference in its entirety.

BACKGROUND

With the number of users having access to digital video recorders (DVRs) and the like, users have the ability to create vast amounts of stored content. However, the ability to store recorded content is limited, and there remains a need to assist users in using their storage space and content more effectively.

SUMMARY

The following summary is for illustrative purposes only, and is not intended to limit or constrain the detailed description.

In some embodiments, a system may receive primary content segmented into portion. An example of the primary content may be an episode of a television program. Commercial content may be interspersed between the portions of the primary content. In an aspect, there may be different types or versions of the primary content.

In an aspect, commercial content may include content such as commercials or other advertisements. In such an example, the primary content is different content from the commercial content. The system may receive a user request to schedule a recording of the primary content, e.g., the episodic content that has commercials interspersed among and/or between portions of the episodic content. A local or remote recording device, such as a digital video recorder, may record the primary content. The portions of the primary content may be aggregated sequentially. Finally, the recording of the aggregated content may be maintained and preceded by additional content. The additional content may be one or more commercials so that a user accessing the episodic content can watch the entire episodic content without commercial interruption by watching one or more, or all, commercials prior to the episodic content.

In some embodiments, the system may detect the ends of portions of episodic content and the beginning of portions of commercial content as well as detecting the ends of portions of commercial content and the beginning of episodic content. Detection of ending and beginning points of content may be based upon data received on time intervals for commercial content that may be received from content sources or from a database of known time intervals for insertion of commercial content.

In other embodiments, when scheduling a recording of primary content, a user may be provided an option for aggregating commercials interspersed in the primary content as well as aggregating the primary content. Then, the system may maintain the primary content preceded by the aggregated commercials or by other content.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 5 illustrates an example process flow for implementing various features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
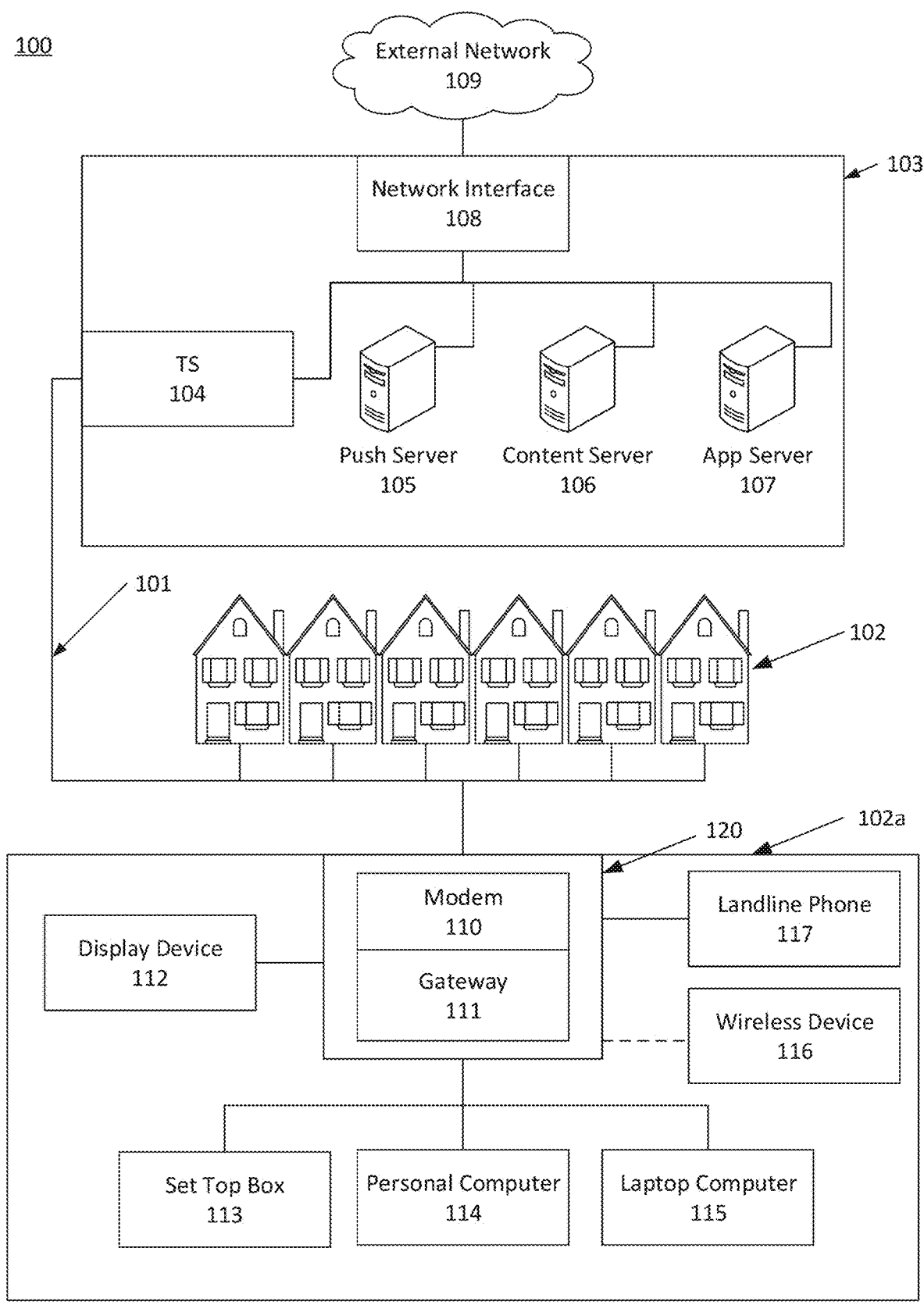
FIG. 1 illustrates an example network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 also may include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., transmission) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol-VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
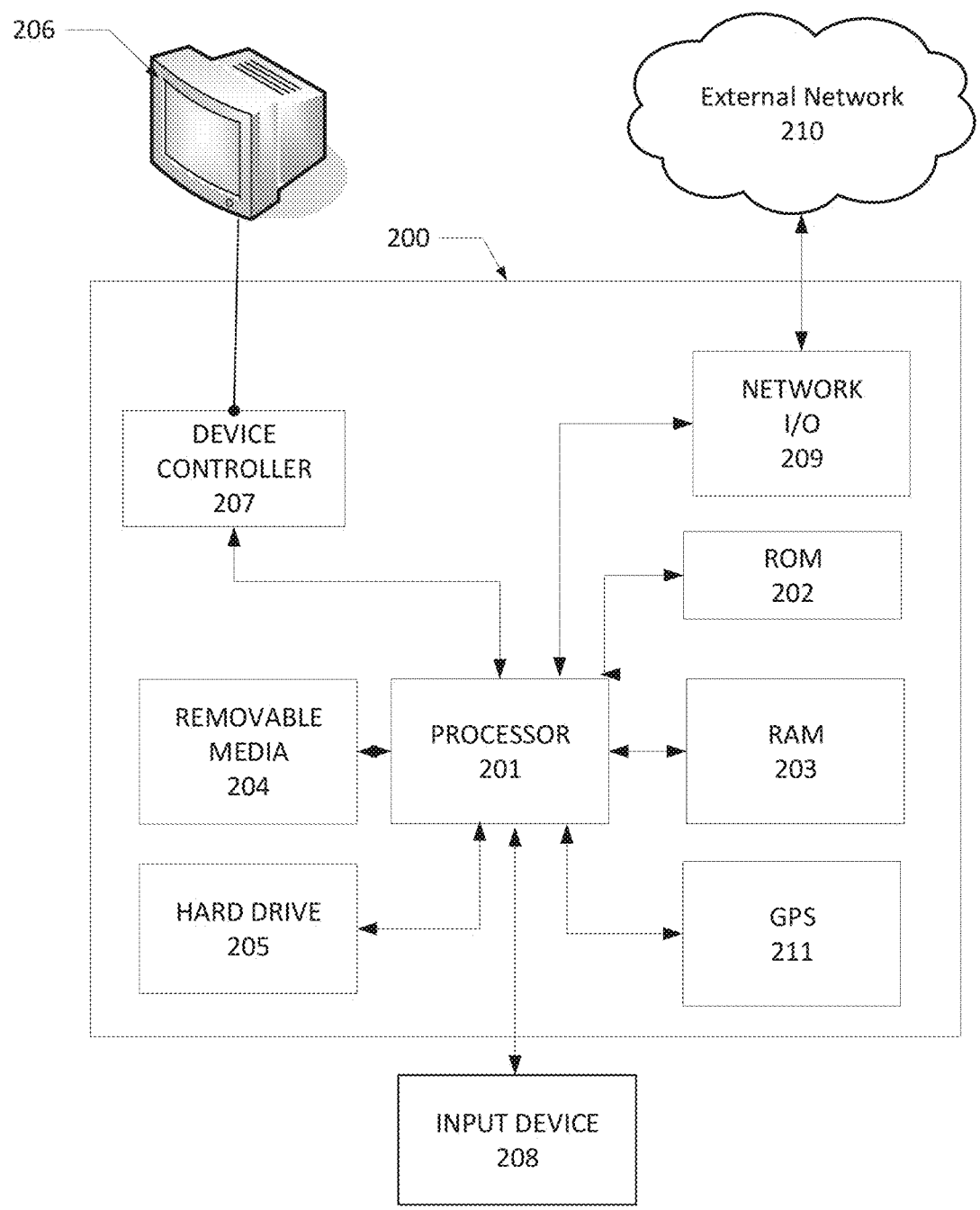
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
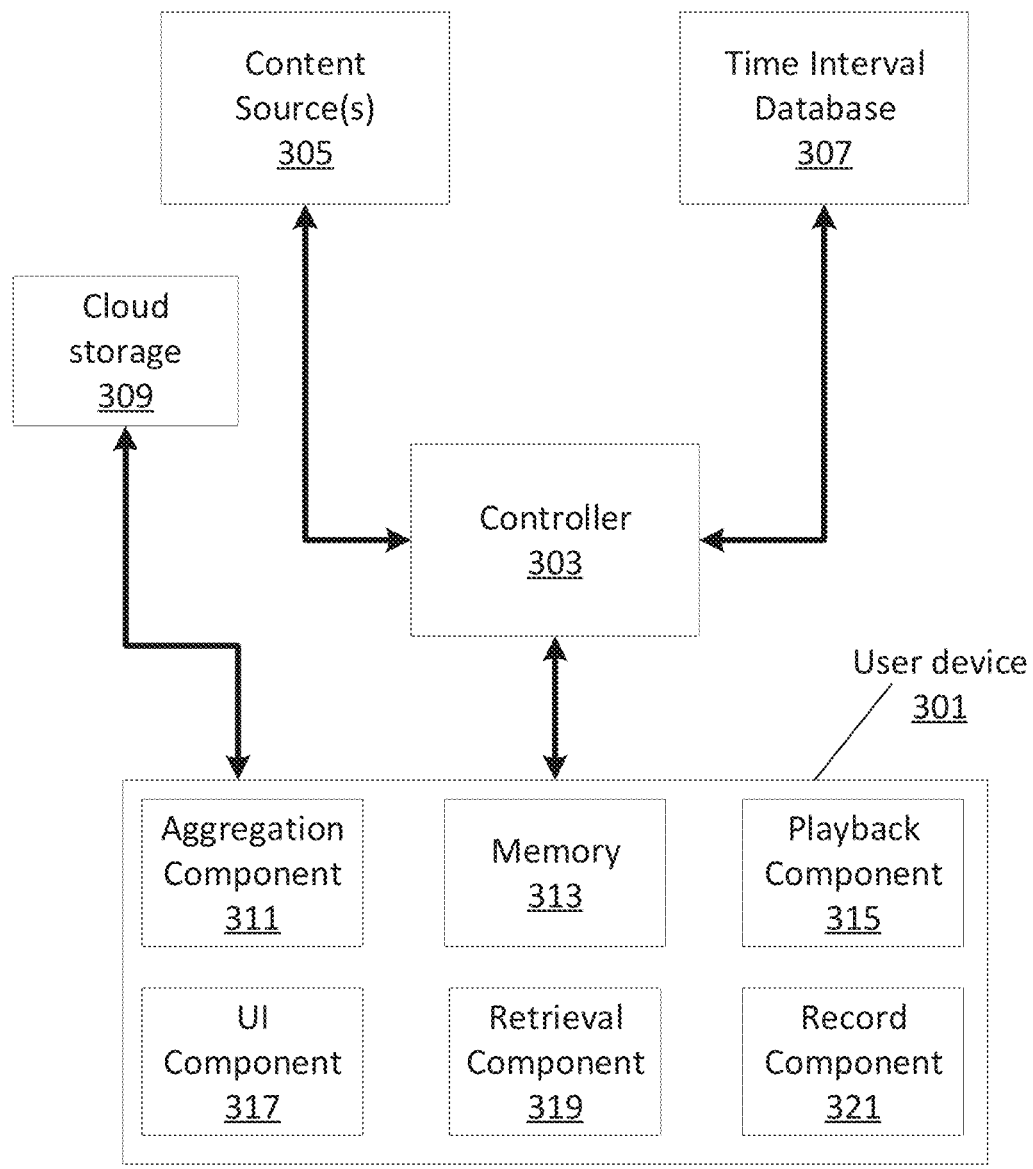
FIG. 3 illustrates an example content storage hierarchy.

FIG. 3 illustrates an example content storage hierarchy. Features described herein may involve a multiple-level hierarchy of devices that can be used to assist in storing a user's content. A content storage device that a user uses to consume and/or store content may be located within a user's home premises 102a and may be operatively connected to a controller, which may be located upstream from a user's home premises, such as at a local office 103. For example, a hard drive storage 313 on a user device 301, such as a DVR, that is used to play recorded video programs, or the FLASH memory of a laptop 115 or tablet 116 computer, or a storage device associated with a local or home network. Such a content storage device is quickly and easily accessible by the consumption device, which may also minimize the need for network bandwidth. Larger storages are available at other devices, such as a network computing device, e.g., a DVR application server, which may be an application server 107 located at the local office 103. An nDVR server may have a large array of storage capacity, such as multiple arrays of large hard drives, FLASH memories, and other forms of storage. Although illustrative examples described herein are directed to a DVR type device located within a home premises of a user, other devices, such as an nDVR server type device may be similarly utilized to perform one or more operations described herein.

As shown in FIG. 3, a controller 303 is operatively connected to content source infrastructure or content source 305, a time interval database 307, and a user device 301. In this example, user device 301 is described as a user device 301 in her home premises 102a. Although not explicitly shown in FIG. 3, the connections between the various components may be through one or more other components including networks, such as network 210 and network of links 101. As illustratively shown, controller 303 may be configured to obtain secondary content (commercials) time intervals for a given primary content (e.g., a show) from multiple possible sources. In one example, content source 305 may be queried by the controller 303 to retrieve the specific time intervals (start/stop times) for each selected show's commercial breaks. Content source 305 may be one or more devices configured to insert secondary content into primary content for distribution to one or more users. Primary content may be an episodic television program and secondary content may be one or more commercials.

In another example, a time interval database 307, similar or as part of an electronic program guide, may be queried to obtain the commercial time intervals. Such an example of archiving the time intervals of commercials on a server-based repository may allow for more efficient processing. Time interval database 307 may be one or more devices configured to maintain secondary content for insertion into primary content for distribution to one or more users. Time interval database 307 may include one or more tables of secondary content associated with one or more primary content. Time interval database may associate secondary content specific to a particular primary content or may associate secondary content based upon some other parameter, such as time of day, day of week, a desired time interval length for the secondary content, and the like. As such, controller 303 may receive data identifying commercial breaks with respect to any given primary content for distribution to a user device 301 as needed.

For episodic content where the specific time for commercial breaks are known to occur at exact specific time intervals within a distribution stream well ahead of the actual transmission of the content, controller 303 may be configured to pull such data at the time of preparation of transmission of the primary content from one of the content source 305 and/or the time interval database 307. Alternatively, many live programs, such as football and basketball games, do not have specific times for commercial breaks. In such cases, there is usually a time frame that commercials are to occur, e.g., at time outs, when there is a certain amount of time left in a quarter or half, or at the end of a period of play. As such, controller 303 may be configured to retrieve such data from content source 305 and/or time interval database 307 shortly before transmission of the content to users.

Figure 4A:
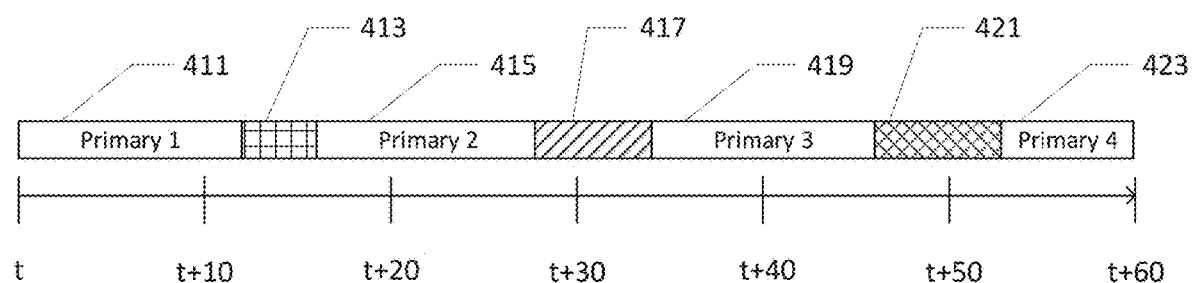
FIGS. 4A-4C illustrate example transmission and recording timelines for content.

User device 301 is shown to include various components for acquisition of user desired content, storage of the user desired content, and playback of the user desired content. Memory 313 may be a hard drive for storage of one or more assets of content that a user desired to maintain in the user device 301. As described herein, such assets may be episodic content with secondary content, such as commercials interspersed between portions of the episodic content. FIG. 4A illustrates an example timeline of transmission content for a one hour period from time "t" to time "t+60." Such an example may include a one hour episode of a television program that is distributed from 8 pm to 9 pm. In this example, there are four portions, primary content portion 1 411, primary content portion 2 415, primary content portion 3 419, and primary content portion 4 423. Interspersed between portions of the primary content are secondary content 413, 417, and 421. Secondary content may be one or more different commercials. As such, each secondary content 413, 417, and 421 may be of a different duration of time. Similarly, primary content portion 1 411, primary content portion 2 415, primary content portion 3 419, and primary content portion 4 423 may be of a different duration of time. For example, primary content portion 1 may be of a longer duration of time than primary content portion 4. Therefore, memory 313 in user device 301 may be configured to maintain the entire one hour period with the portions of primary content and interspersed commercials in the same time sequence as they were distributed to users. Memory 313 of user device 301 may be configured to buffer the portions of primary content and commercial breaks until the television program is over. Then, the data may be assembled into an MPEG file for storage in memory 313.

Figure 4B:
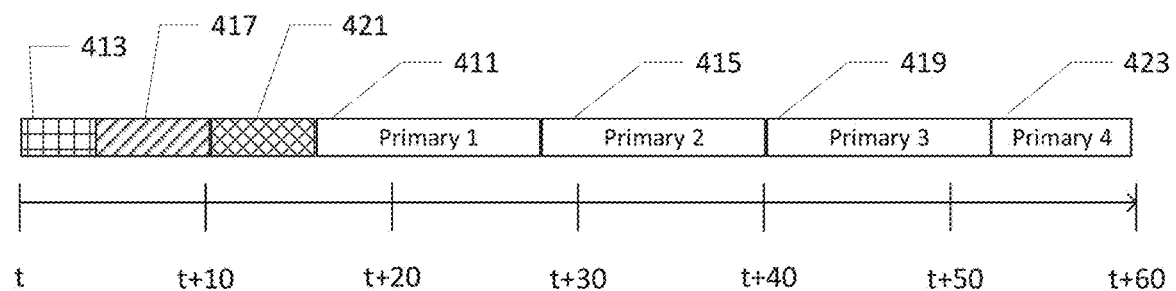

In still other examples as described herein, assets may be portions of episodic content aggregated together and accompanied with secondary content that may be aggregated commercials or other content that precedes the aggregated episodic content sequentially. FIG. 4B illustrates an example timeline of stored content for a one hour period from time "t" to time "t+60." Such an example may include a one hour episode of a television program that is distributed from 8 pm to 9 pm. In this example, there are four portions, primary content portion 1 411, primary content portion 2 415, primary content portion 3 419, and primary content portion 4 423. Preceding the portions of the primary content in time sequence are secondary content 413, 417, and 421. Secondary content may be one or more different commercials that were interspersed between the portions of the primary content when distributed. In this example, memory 313 in user device 301 may be configured to maintain the entire one hour period with the primary content portions preceded by the interspersed commercials.

Figure 4C:
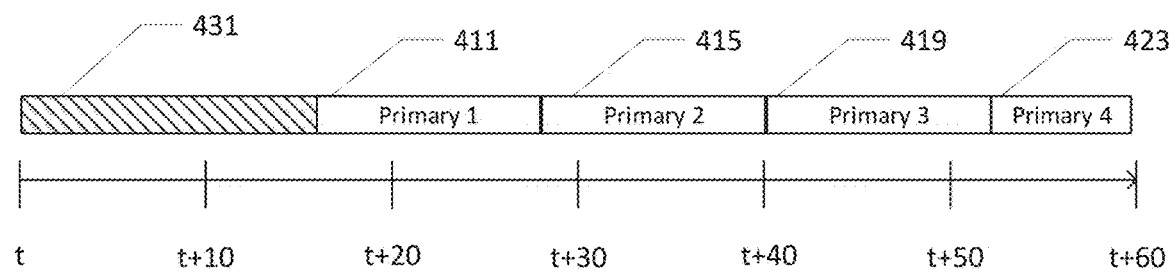

In yet another example, interspersed secondary content may be removed and different secondary content may be included. FIG. 4C illustrates an example timeline of stored content for a one hour period from time "t" to time "t+60." Such an example may include a one hour episode of a television program that is distributed from 8 pm to 9 pm. In this example, there are four portions, primary content portion 1 411, primary content portion 2 415, primary content portion 3 419, and primary content portion 4 423. Preceding the portions of the primary content in time sequence is secondary content 431. Secondary content may be one or more different commercials than those that were interspersed between the portions of the primary content when distributed. Secondary content 431 may be content locally stored on user device 301 and/or may be content retrieved from controller 303 and/or some other external source. In this example, memory 313 in user device 301 may be configured to maintain the primary content portions preceded by secondary content.

User device 301 also includes a playback component 315. Playback component 315 may be one or more devices and/or circuits for allowing a user to playback content that has been recorded by a record component 321 and/or maintained in memory 313. Playback component 315 may include certain trick play features to allow a user to fast forward through some content, to pause the playback of content, to rewind the content to an earlier point in a maintained content, and to skip ahead or skip back to a different point in the maintained content. User device 301 includes a record component 321. Record component 321 may be one or more devices and/or circuits for allowing for the recording of distributed content received from an external source, such as a local office 103. Record component 321 may be configured to record content that is eventually maintained in memory 313. Record component 321 may be operable with memory 313 and aggregation component 311 to record content in portions for eventual aggregation and storage in memory 313.

User device 301 also includes aggregation component 311. Aggregation component 311 may be one or more devices and/or circuits for combining certain content into an aggregated set of content. For example, aggregation component 311 may operate to aggregate primary content portion 1 411, primary content portion 2 415, primary content portion 3 419, and primary content portion 4 423 from FIG. 4A into the aggregated set shown in FIG. 4B or FIG. 4C. Similarly, aggregation component 311 may operate to aggregate various secondary content, e.g., commercial breaks, such as secondary content 413, 417, and 421 in FIG. 4A into an aggregated set as shown in FIG. 4B. Aggregation component 311 may be configured to aggregate content that is eventually maintained in memory 313. In some embodiments, in conjunction with content retrieval component 319, other secondary content that was not interspersed commercial breaks included with primary content but was received through retrieval component 319 may be maintained in memory 313. In such a situation, the other secondary content retrieved from content retrieval component 319 may precede the aggregated portions of primary content when maintained in memory 313, such as shown in FIG. 4C. Aggregation component 311 may be configured to receive time interval data representative of commercial breaks in the primary content. Such time interval data may be detected in the distributed transmission and may be received by controller 303 from content source 305 and/or time interval database 307. Aggregation component 311 may be configured to detect when a portion of primary content ends and when a portion of a commercial break begins. Similarly, aggregation component 311 may be configured to detect when a commercial break ends and when a portion of primary content begins.

In another embodiment, storage of portions of primary content and/or commercial breaks may include storing the portions separately as separate MPEG files in memory 313 of user device 301. Then, during a playback operation by a user, the user device 301 may be configured to have the aggregation component 311 aggregate the various portions of the primary content together as an option to the user and have that aggregated set be preceded by the portions of commercial breaks and/or other content as described herein. As described herein, the aggregation of portions of primary and/or secondary content may occur as a television program is being recorded, immediately after have a television program has ended, or even much later as part of the playback process.

User device 301 further includes content retrieval component 319. Content retrieval component 319 may be one or more devices and/or circuits for obtaining certain content to be maintained with other content, such as aggregated episodic content, in memory 313. Content retrieval component 319 may be configured to retrieve a block of secondary content from an external source, such as through controller 303, and/or from an internal memory source, such as in memory 313. Content retrieval component 319 may be utilized when a secondary content, that is not distributed commercials interspersed between portions of distributed primary content, is to be maintained in memory 313 along with aggregated portions of primary content. For example, when a user desired to watch an entire episode without commercial break, content retrieval component 319 may retrieve one single commercial for maintenance with the entire episode in memory 313. The commercial retrieved by content retrieval component 319 may include one or more of the distributed commercial breaks that were interspersed between portions of the primary content desired to be recorded by the user.

User device 301 also is shown to include a UI component 317. UI component 317 may be configured to allow for interaction of a user with the user device 301. UI component 317 may include hardware, software, and/or combinations to receive inputs from a user and provide outputs to a user. UI component 317 may include a an ability to output a user interface for permitting a user to record content distributed to the user device 301 whether currently or in the future.

Figure 6:
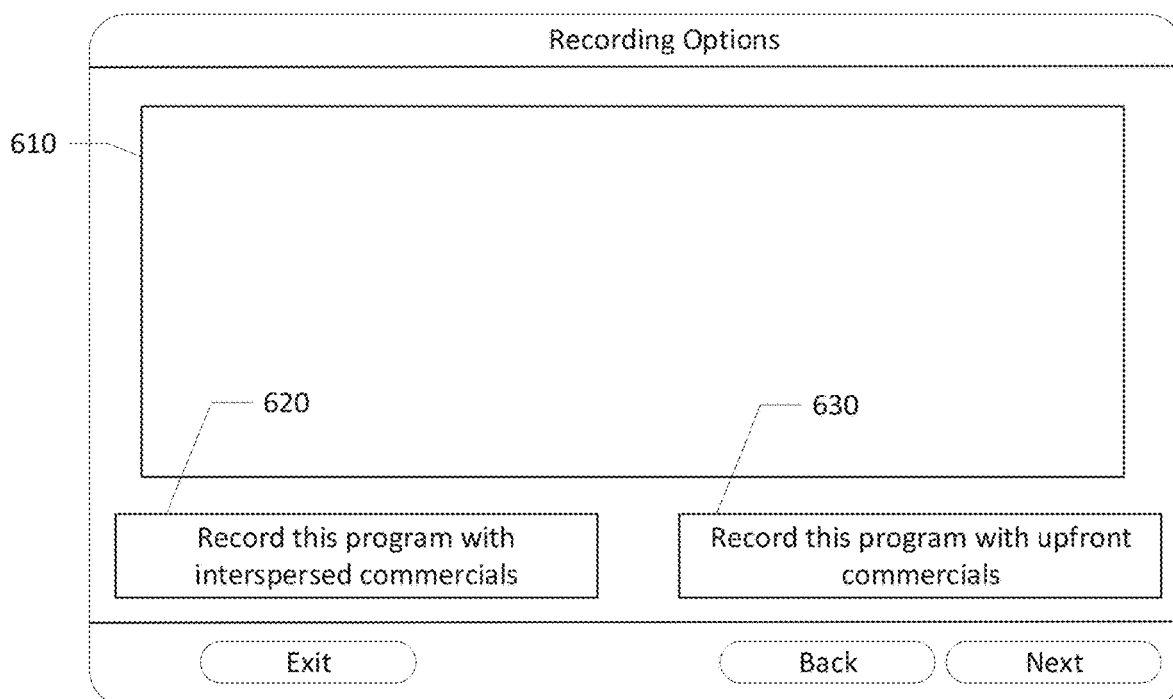
FIG. 6 illustrates an example interface that may be presented to a user in aspects described herein.

A piece of video content, such as a television program, being viewed by a user may be interrupted for a commercial break. At that time or any time before or after, a user may request through a pop-up window an option to view the entire content without interspersed commercials. A screen such as that shown in FIG. 6 may be used to display the option for a user. As shown, currently viewed content may be shown in box 610. For example, a user may be watching episodic content and a commercial is currently being shown. In this example, the commercial being shown would be shown in box 610. An overlay for recording options provides some options for a user that wants to record the episode and maintain it in memory 313 of user device 301. The first option may be a button 620 that allows a user to record the current episodic content program with the interspersed commercials just as they are distributed to the user. If a user does not care to have the primary content of the episodic content program aggregated together without commercial breaks, the user may select the option of button 620.

Alternatively, the user may be prompted by button 630 that allows the user to record the current episodic content program without the commercials interspersed between primary content. If a user does not want commercial interruption in the primary content of the episodic content program, the primary content may be aggregated together without interspersed commercial breaks and the commercial breaks may be aggregated together to precede the aggregated primary content in storage in the memory 313. Alternatively the primary content may be aggregated together without interspersed commercial breaks, and other secondary content, such as may be obtained from content retrieval component 319, may precede the aggregated primary content in storage in the memory 313. As a trade-off for this functionality—to have the entire primary content without interspersed commercial content-a non-skippable advertisement segment could be inserted into the beginning and/or end or other portion (e.g., prior to a climactic scene) of the recorded primary content. If the commercial-less recording was started in the middle of a television show (for example, as a result of selecting button 630 from the overlay described in FIG. 6) any of the television show which was available in the live on disk buffer from the guide may be inserted into the commercial-less primary content for storage.

Returning to FIG. 3, user device 301 is shown to be operatively connected to some type of cloud storage 309, such as a cloud DVR. Cloud storage 309 allows for the functions of a user's home DVR to occur via a cloud network of a service provider. In some embodiments, cloud storage 309 may perform one or more of the features of user device 301 and/or may include one or more of the components of user device 301 as described herein. For example, a user may play back a television program and have commercials aggregated together upfront. The cloud storage 309 may distribute the requested content to the user in the requested format, e.g., having all commercial content upfront.

FIG. 5 illustrates an example process of managing content. The process may be performed by one or more computing devices, such as the consumption device 113/115/116, user device 301, cloud storage 309, archive storage devices, controller 303, content source 305, and time interval database 307, alone or in combination. The discussion below refers to the steps being performed by one or a combination of these devices, but the system herein may be distributed among a variety of devices, and the steps may be performed, individually or in combination, by any other networked device if desired, so the description herein may simply refer to the system performing the various steps. In step 501, distributed primary content with interspersed secondary content, e.g. commercials, are received by a computing device, such as user device 301. The distributed primary content with interspersed commercials may be processed by a date processing facility, such as a local office 103.

In step 502, a determination may be made as to whether a user request has been received to record or otherwise stored a currently distributed or future scheduled primary content. In one example, the user may request to record a television show that the user is watching. In another example, the user may request the recording of a television show in the future. If a request is not received, the process may return to step 501. If such a request to record primary content is received, the process moves to step 503. In step 503, a first portion of primary content may be recorded. Such a recording may occur by the user device 301 in FIG. 3 or another device, e.g., cloud DVR. The request to record the primary content may be through a user interface such as the illustrative screen shown in FIG. 6. With respect to the example shown in FIG. 4A, primary content portion 1 411 may be the first portion to be recorded in step 503. Memory 313 of user device 301 may be configured to buffer the primary content and commercials until the television program is over. Then, the data can be assembled into an MPEG file.

Moving to step 504, a determination may be made as to whether an end of a portion of the primary program being recorded and/or a beginning of a commercial break has been detected. Such time interval data for when a portion ends and/or when a portion begins may be obtained from the content itself (e.g., metadata), or content source 305 and/or time interval database 307. The determination can also be made based on markers in the video stream, such as an identification in packets containing the different portions. If such a detection had not yet occurred, the process may return to step 503. When such a detection does occur, the process moves to step 505. In step 505, a determination may be made as to whether the previously recorded portion was the final portion of the primary content. For example, such a determination may be made as to whether a new episodic primary content has started (e.g., now it is 9 pm and a new television show has started). If the portion was the last portion of the primary content, the process may proceed to step 508. If the portion was not the last portion, the process may proceed to step 506.

In step 506, the commercial content may be recorded. The commercial content may be one or more commercials or any other data inserted into the main content (e.g., supplemental and/or interactive data) that make up a commercial break. Such a commercial break may be interspersed between portions of a television program or the primary content. The commercial content may be any type of advertisement and/or content that is not the primary content, e.g., the episodic television show itself. Proceeding to step 507, a determination may be made as to whether an end of the commercial break being recorded and/or a beginning of a next portion of the primary content has been detected. Such time interval data for when a portion ends and/or when a portion begins may be obtained from the content, content source 305 and/or time interval database 307. If such a detection had not yet occurred, the process may return to step 506. When such a detection does occur, the process returns to step 503 to record the next portion of the primary content.

When proceeding to step 508 from step 505, the portions of the primary content that were recorded may be aggregated together in a sequential manner so that the primary content does not include interspersed commercial content. In one aspect, aggregation component 311 may operate step 508. Step 508 may include aggregating multiple portions of primary content, such as primary content portion 1 411, primary content portion 2 415, primary content portion 3 419, and primary content portion 4 423 from FIG. 4A, into an aggregated sequential set of portions of primary content without interspersed commercial breaks, such as shown in FIG. 4B and FIG. 4C. As part of the offering to allow a user to record a television program without interspersed commercial breaks, the maintained recording may include secondary content that precedes the recorded primary content as described herein.

Figure 7:
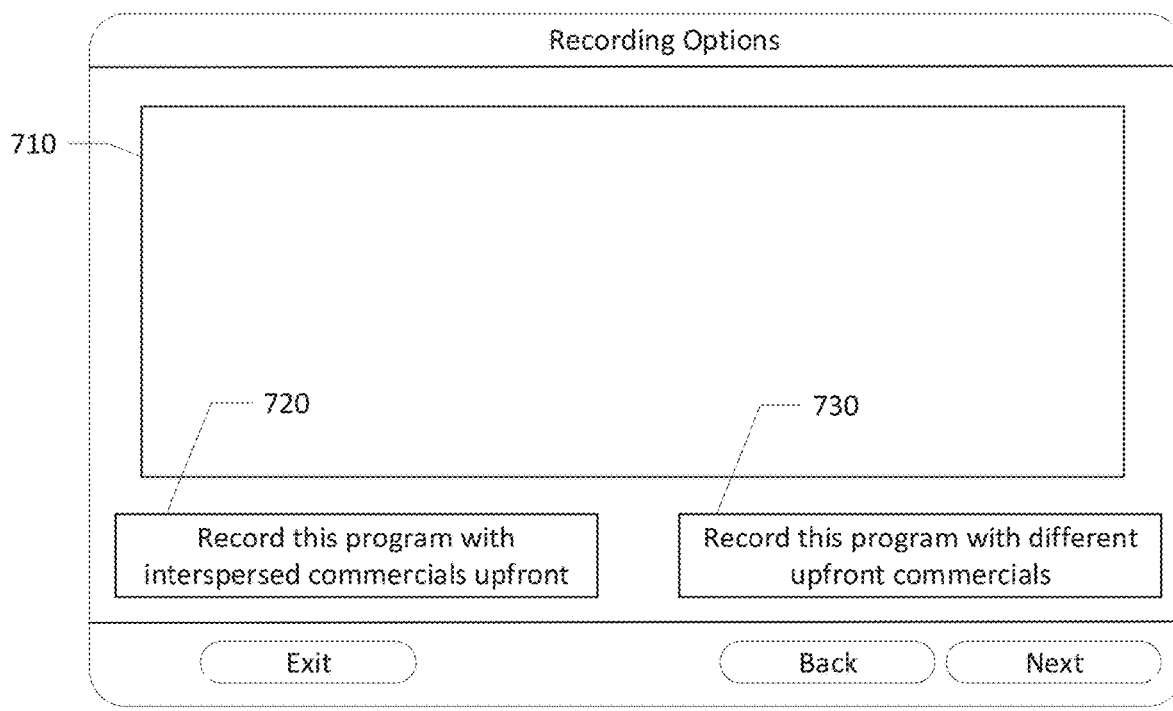
FIG. 7 illustrates another example interface that may be presented to a user in aspects described herein.

In step 509, a determination may be made as to whether the interspersed commercial breaks included with the primary content in step 501 are to remain/be included in the maintained recording of the primary content. An example of gathering and including the interspersed commercial breaks as a preceding set of content to the primary content is shown in FIG. 4B. If the determination from step 509 is to not include the interspersed commercial content, the process moves to step 511. Alternatively, if the determination from step 509 is to include the interspersed commercial content from step 501, the process moves to step 510. The determination of step 509 may be implemented by a user interface provided to a user and a response received from the user. Such a user interface screen is shown in FIG. 7. As shown, currently viewed content may be shown in box 710. For example, a user may be watching episodic content and a commercial is currently being shown. In this example, the commercial being shown would be shown in box 710. An overlay for recording options provides some options for a user that wants to record the episode and maintain it in memory 313 of user device 301. The first option may be a button 720 that allows a user to record the current episodic content program with the interspersed commercials preceding the primary content of the episode. If a user prefers to have the primary content of the episodic content program aggregated together with the original commercial that were distributed with the primary content, the user may select the option of button 720.

Alternatively, the user may be prompted by button 730 that allows the user to record the current episodic content program without the commercials interspersed between primary content and rather to have other secondary content preceding the primary content. The primary content may be aggregated together without interspersed commercial breaks and other secondary content, such as may be obtained from content retrieval component 319, may precede the aggregated primary content in storage in the memory 313. As a trade-off for this functionality—to have the entire primary content without interspersed commercial content-a non-skippable advertisement could be inserted into the beginning, middle, and/or end of the recorded primary content or at another portion such as a climactic or intriguing scene, as a condition for delivery or presentation of the primary content. If the commercial-less recording was started in the middle of a television show (for example, as a result of selecting button 730) any of the television show which was available in the live on disk buffer from the guide may be inserted into the commercial-less primary content for storage.

Returning to FIG. 5, in step 510, the commercial breaks, which were recorded in step 506, may be aggregated together for maintaining with the aggregated primary content from step 508 in a memory of a user device, such as memory 313 of user device 301 in FIG. 3. Aggregation component 311 may operate step 510. Step 510 may include aggregating multiple portions of secondary content, such as secondary content 413, secondary content 417, and secondary content 421 from FIG. 4A, into an aggregated set of portions of secondary content, such as shown in FIG. 4B.

In step 511, the aggregated portions of primary content may be combined with additional content that precedes the aggregated primary content. If the additional content is the aggregated recorded commercial content from step 510 that was interspersed with the primary content portions in step 501, such as shown in FIG. 4B, the recorded commercial content from step 506 that was aggregated in step 510 is combined with the aggregated primary content from step 508. The aggregated commercial content from step 510 would precede the aggregated primary content, such as shown in FIG. 4B. If the additional content is not the aggregated recorded commercial content from step 510 (such as preceding from step 509 directly to step 511), but rather other secondary content (which may still be one or more commercials), such as shown as secondary content 431 in FIG. 4C, the secondary content is combined with the aggregated primary content from step 508. The secondary content would precede the aggregated primary content, such as shown in FIG. 4C. In such an example where the additional content is not the aggregated recorded commercial content from step 510, the secondary content that precedes the primary may be retrieved from content retrieval component 319 in FIG. 3.

Proceeding to step 512, the aggregated portions and primary content preceded by the additional content is maintained. Maintenance may occur within a memory of a user device, such as memory 313 in user device 301. Thereafter, the maintained content may be played back by a user device, such as by playback component 315 in user device 301 in FIG. 3.

Although the example of FIG. 5 is described with respect to recordation of an episodic primary content, aspects of the present disclosure for recording primary content and aggregating the portions is not so limited. The primary content may be a live event, such as a concert being distributed, or a sporting event. In such circumstances, aspects of the present disclosure for implementation of recording of the primary content, e.g., the sporting event, separate from the commercial breaks may still be implemented.

Figure 8:
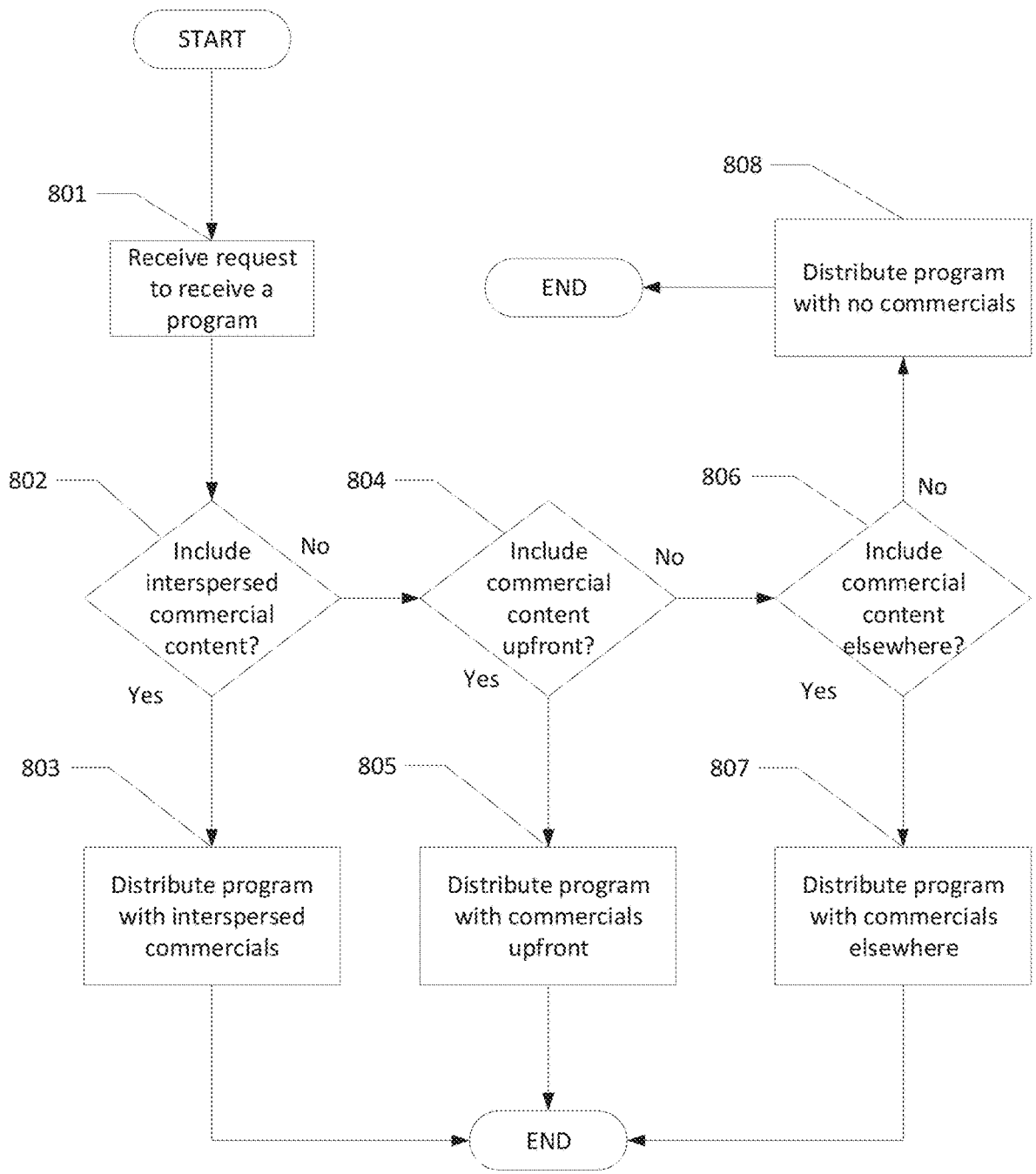
FIG. 8 illustrates an example process flow for implementing various features described herein.

FIG. 8 illustrates an example process flow for implementing various features described herein. The process may be performed by one or more computing devices, such as the consumption device 113/115/116, user device 301, cloud storage 309, archive storage devices, controller 303, content source 305, and time interval database 307, alone or in combination. The discussion below refers to the steps being performed by one or a combination of these devices, but the system herein may be distributed among a variety of devices, and the steps may be performed, individually or in combination, by any other networked device if desired, so the description herein may simply refer to the system performing the various steps. In step 801, a request is received. The request is to receive a television program. One example may be a request by a home user to watch a particular television program on a television.

In step 802 a determination may be made as to whether commercial content is to be included in an interspersed manner. FIG. 4A illustrates such a scenario where a television program, broken into four portions of content, has commercial breaks between the portions. Such a determination in step 802 may be based upon an indicator received from a user. For example, the request received in step 801 may include an indicator that the user desires to receive the television program with interspersed commercials. In still other embodiments, the system may ask the user, after the initial request is received in step 801, as to the desired format to receive the television program. In further embodiments, the system may determine whether to include interspersed commercial content or whether to include commercial content in some other manner or even not at all. If interspersed commercial content is not to be included, the process proceeds to step 804. If interspersed commercial content is to be included, the process moves to step 803 where the requested television program is distributed with interspersed commercials. FIG. 4A is an illustrative example of the distribution in step 803.

Moving to step 804, a determination may be made as to whether commercial content is to be included upfront with the entire television program following the commercial content. FIGS. 4B and 4C illustrate such a scenario where a television program, broken into four portions of content, has all commercial content preceding the television program. Such a determination in step 804 may be based upon an indicator received from a user. For example, the request received in step 801 may include an indicator that the user desires to receive the television program with commercials upfront. In still other embodiments, the system may ask the user, after the initial request is received in step 801, as to the desired format to receive the television program. In further embodiments, the system may determine whether to include interspersed commercial content or whether to include commercial content in some other manner or even not at all. If upfront commercial content is not to be included, the process proceeds to step 806. If upfront commercial content is to be included, the process moves to step 805 where the requested television program is distributed with commercial content upfront.

Proceeding to step 806, a determination may be made as to whether commercial content is to be included elsewhere than interspersed or upfront. Such a scenario may be a television program, broken into two portions of content, having all commercial content occur in the middle of the television program. Such a determination in step 806 may be based upon an indicator received from a user. For example, the request received in step 801 may include an indicator that the user desires to receive the television program with commercials at the end. In still other embodiments, the system may ask the user, after the initial request is received in step 801, as to the desired format to receive the television program. In further embodiments, the system may determine whether to include interspersed commercial content or whether to include commercial content in some other manner or even not at all. If commercial content is not to be included elsewhere, the process proceeds to step 808. If commercial content is to be included elsewhere, the process moves to step 807 where the requested television program is distributed with commercial content elsewhere, such as at the end. In step 808, the requested television program is distributed with no commercial content.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   causing, after output of a first advertisement following a first portion of a content item, output of:
   a first viewing option to view a second portion of the content item with one or more second advertisements interspersed between a beginning and an end of the second portion of the content item; and
   a second viewing option to view the second portion of the content item with the one or more second advertisements aggregated;
   generating, based on selection of the second viewing option:
   an aggregated advertisements portion having all of the one or more second advertisements;
   selecting an important scene in other segments of the content item; and
   causing, based on selection of the second viewing option, output of the aggregated advertisements portion preceding the important scene.

2. The method of claim 1, further comprising:
   causing output of a third viewing option to view the content item with a plurality of different advertisements aggregated before the beginning of the second portion of the content item.

3. The method of claim 1, further comprising:
   storing, in a single file, an aggregated content portion comprising an aggregation of segments of the content item and the aggregated advertisements portion.

4. The method of claim 1, further comprising:
   outputting the aggregated advertisements portion before the beginning of the second portion of the content item or after the end of the second portion of the content item.

5. The method of claim 1, wherein the content item comprises a playlist indicating a sequence of playback for segments of the content item and the aggregated advertisements portion.

6. The method of claim 1, wherein the important scene comprises a climactic scene in the content item.

7. A method comprising:
causing, after output of a first advertisement following a first portion of a content item and based on a request to access a second portion of the content item, output of:
first output option for outputting the second portion of the content item with interspersed advertisements; and
second output option for outputting the second portion of the content item with an aggregated advertisements portion comprising all advertisements of the second portion of the content item;
selecting an important scene in the second portion of the content item; and
outputting, based on the request and based on selection of the second output option, the second portion of the content item with the aggregated advertisements portion preceding the important scene.

8. The method of claim 7, wherein all of the advertisements comprise all of the advertisements between a beginning of the second portion of the content item and an end of the second portion of the content item.

9. The method of claim 7, wherein the outputting the second portion of the content item comprises outputting an aggregation of other segments of the second portion of the content item.

10. The method of claim 7, further comprising:
outputting the aggregated advertisements portion before a beginning of the second portion of the content item or after an end of the second portion of the content item.

11. The method of claim 7, further comprising:
causing output of a third viewing option to view the second portion of the content item with a plurality of different advertisements aggregated in a beginning of the second portion of the content item.

12. The method of claim 7, wherein the aggregated advertisements portion comprises a greater quantity of advertisements than a quantity of the advertisements of the second portion of the content item.

13. An apparatus comprising:
one or more processors; and
memory storing instructions that, when executed by the one or more processors, configure the apparatus to:
cause, after output of a first advertisement following a first portion of a content item and based on a request to access a second portion of the content item, output of:
first output option for outputting the second portion of the content item with interspersed advertisements; and
second output option for outputting the second portion of the content item with an aggregated advertisements portion comprising all advertisements of the second portion of the content item;
selecting an important scene in the second portion of the content item; and
output, based on the request and based on selection of the second output option, the second portion of the content item with the aggregated advertisements portion preceding the important scene.

14. The apparatus of claim 13, wherein the instructions, when executed by the one or more processors, further cause the apparatus to output the second portion of the content item by causing the apparatus to:
output a viewing comprising:
all of the interspersed advertisements between a beginning of the content item and an end of the content item; and
an aggregated content portion comprising an aggregation of other segments of the second portion of the content item.

15. The apparatus of claim 13, wherein the instructions, when executed by the one or more processors, further cause the apparatus to output a third output option to view the second portion of the content item with a plurality of different advertisements aggregated in a beginning of the second portion of the content item.

16. The apparatus of claim 13, wherein the instructions, when executed by the one or more processors, further cause the apparatus to:
store, in a single file:
an aggregated content portion comprising an aggregation of other segments of the second portion of the content item, and
the aggregated advertisements portion.

17. A non-transitory, computer-readable medium storing instructions that, when executed, cause:
outputting, after output of a first advertisement following a first portion of a content item and based on a request to access a second portion of the content item:
first output option for outputting the second portion of the content item with interspersed advertisements; and
second output option for outputting the second portion of the content item with an aggregated advertisements portion comprising all advertisements of the second portion of the content item;
selecting an important scene in the second portion of the content item; and
outputting, based on the request and based on selection of the second output option, of the second portion of the content item with the aggregated advertisements portion preceding the important scene.

18. The non-transitory, computer-readable medium of claim 17, wherein the important scene comprises a climactic scene in the content item.

19. The non-transitory, computer-readable medium of claim 17, wherein the instructions, when executed, further cause:
outputting a third output option to view the second portion of the content item with a plurality of different advertisements aggregated before a beginning of the second portion of the content item.

20. The non-transitory, computer-readable medium of claim 17, wherein the aggregated advertisements portion comprises a greater quantity of advertisements than a quantity of the advertisements of the content item.

* * * * *